(12) United States Patent
Carter et al.

(10) Patent No.: US 10,906,132 B2
(45) Date of Patent: Feb. 2, 2021

(54) SCAN STRATEGIES FOR EFFICIENT UTILIZATION OF LASER ARRAYS IN DIRECT METAL LASER MELTING (DMLM)

(71) Applicant: General Electric Company, Schenectady, NY (US)

(72) Inventors: William Thomas Carter, Galway, NY (US); Jason Harris Karp, Niskayuna, NY (US); Justin John Gambone, Jr., Watervliet, NY (US); Lang Yuan, Niskayuna, NY (US); David Charles Bogdan, Jr., Charlton, NY (US); Victor Petrovish Ostroverkhov, Ballston Lake, NY (US); Marshall Gordon Jones, Scotia, NY (US); Michael Evans Graham, Slingerlands, NY (US); Kevin George Harding, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 677 days.

(21) Appl. No.: 15/476,498

(22) Filed: Mar. 31, 2017

(65) Prior Publication Data

US 2018/0281113 A1    Oct. 4, 2018

(51) Int. Cl.
   B23K 26/00      (2014.01)
   B23K 26/342     (2014.01)
   (Continued)

(52) U.S. Cl.
   CPC ........ B23K 26/342 (2015.10); B23K 26/0006 (2013.01); B23K 26/0604 (2013.01);
   (Continued)

(58) Field of Classification Search
   CPC ........ B23K 26/34; B23K 26/08; B23K 26/14; B23K 26/0006; B23K 26/0604;
   (Continued)

(56) References Cited

U.S. PATENT DOCUMENTS

| | | | |
|---|---|---|---|
| 5,592,462 A | 1/1997 | Beldock et al. | |
| 6,274,839 B1 * | 8/2001 | Stone | B23K 9/04 219/125.1 |

(Continued)

FOREIGN PATENT DOCUMENTS

| | | | | |
|---|---|---|---|---|
| EP | 0790119 A2 * | 8/1997 | | B29C 41/12 |
| WO | 2016/077250 A1 | 5/2016 | | |
| WO | 2016085965 A1 | 6/2016 | | |

OTHER PUBLICATIONS

Smurov et al., "Selective Laser Melting and Direct Metal Deposition: From process fundamentals towards advanced products", 2014 International Conference Laser Optics, pp. 1-1, St. Petersburg, 2014.

(Continued)

*Primary Examiner* — Hung D Nguyen
(74) *Attorney, Agent, or Firm* — Robert McCarthy (57) ABSTRACT

An additive manufacturing system configured to manufacture a component including scan strategies for efficient utilization of one or more laser arrays. The additive manufacturing system includes at least one laser device, each configured as a laser array, and a build platform. Each laser device is configured to generate a plurality of laser beams. The component is disposed on the build platform. The at least one laser device is configured to sweep across the component and the build platform in at least one of a radial direction, a circumferential direction or a modified zig-zag pattern and simultaneously operate the one or more of the plurality of individually operable laser beams corresponding to a pattern of the layer of a build to generate successive (Continued)

layers of a melted powdered material on the component and the build platform corresponding to the pattern of the layer of the build. A method of manufacturing a component with the additive manufacturing system is also disclosed.

20 Claims, 7 Drawing Sheets (51) Int. Cl.
| | |
|---|---|
| *B33Y 10/00* | (2015.01) |
| *B33Y 30/00* | (2015.01) |
| *B33Y 50/02* | (2015.01) |
| *B23K 26/082* | (2014.01) |
| *B23K 26/08* | (2014.01) |
| *B23K 26/144* | (2014.01) |
| *B23K 26/12* | (2014.01) |
| *B23K 26/06* | (2014.01) |
| B23K 103/02 | (2006.01) |
| B23K 103/10 | (2006.01) |
| B23K 103/14 | (2006.01) |
| B23K 103/18 | (2006.01) |

(52) U.S. Cl.
CPC ........ *B23K 26/082* (2015.10); *B23K 26/0823* (2013.01); *B23K 26/123* (2013.01); *B23K 26/127* (2013.01); *B23K 26/144* (2015.10); *B33Y 10/00* (2014.12); *B33Y 30/00* (2014.12); *B33Y 50/02* (2014.12); *B23K 2103/02* (2018.08); *B23K 2103/10* (2018.08); *B23K 2103/14* (2018.08); *B23K 2103/26* (2018.08); *Y02P 10/25* (2015.11)

(58) Field of Classification Search
CPC .............. B23K 26/0626; B23K 26/073; B23K 26/082; B23K 26/0823; B23K 26/0869; B23K 26/123; B23K 26/127; B23K 26/144; B23K 26/32; B23K 26/342; B33Y 10/00; B33Y 30/00; B33Y 50/02; B33Y 10/02; B33Y 10/10; Y02P 10/25; Y02P 10/295
USPC ................... 219/121.12–121.86, 76.1, 76.12
See application file for complete search history.

(56) References Cited

U.S. PATENT DOCUMENTS

| | | | |
|---|---|---|---|
| 6,441,338 B1* | 8/2002 | Rabinovich | .......... B21D 37/205 219/121.64 |
| 9,505,172 B2 | 11/2016 | Ljungblad | |
| 2014/0154088 A1 | 6/2014 | Etter et al. | |
| 2015/0165556 A1 | 6/2015 | Jones et al. | |
| 2015/0177158 A1 | 6/2015 | Cheverton | |
| 2015/0306819 A1 | 10/2015 | Ljungblad | |
| 2015/0375456 A1 | 12/2015 | Cheverton et al. | |
| 2016/0082511 A1 | 3/2016 | Cui et al. | |
| 2016/0136759 A1 | 5/2016 | Broda | |
| 2016/0318129 A1 | 11/2016 | Hu | |
| 2017/0021454 A1 | 1/2017 | Dallarosa et al. | |
| 2017/0021455 A1* | 1/2017 | Dallarosa | ............... B33Y 10/00 |
| 2017/0304894 A1* | 10/2017 | Buller | ..................... B22F 3/105 |

OTHER PUBLICATIONS

Ji, W. J., et al., "Fabrication of functionally graded properties by direct laser melting of compositionally selective metallic powder", Control, Automation and Systems (ICCAS), 2015 15th International Conference on, pp. 1955-1957,Busan, Oct. 13-16, 2015.
Bogdan Jr., David Charles, et al., "Systems and Methods for Additive Manufacturing Rotating Build Platforms", U.S. Appl. No. 15/408,843, filed Jan. 18, 2017.
Zavala-Arredondo, Miguel, et al. "Laser Diode Area Melting for High Speed Additive Manufacturing of Metallic components", Materials and Design, vol. 117, pp. 305-315, 2017.
Harding, Kevin George, et al., "Additive Manufacturing Systems and Methods", U.S. Appl. No. 15/378,116, filed Dec. 14, 2016.
Harding, Kevin George, et al., "Additive Manufacturing Systems and Methods", U.S. Appl. No. 15/380,093, filed Dec. 15, 2016.
Matthews, Harry Kirk, et al., "System and Methods for Fabricating a Component Based on Local Thermal Conductivity of a Build Material", U.S. Appl. No. 15/397,050, filed Jan. 3, 2017.
Yuan, Lang, et al., "Systems and Methods for Controlling Microstructure of Additively Manufactured Components", U.S. Appl. No. 115/400,525, filed Jan. 6, 2017.
Shi, Jinjie, et al., "Systems and Methods for Additive Manufacturing Recoating", U.S. Appl. No. 15/397,050, filed Jan. 6, 2017.
Karp, Jason Harris, et al., "System and Methods for Fabricating a Component With Laser Array", U.S. Appl. No, 15/401,643, filed Jan. 9, 2017.
Bogdan, David Charles, et al., "Systems and Methods for Additive Manufacturing Rotating Build Platforms", U.S. Appl. No. 115/408,843, filed Jan. 18, 2017.
Karp, Jason Harris, et al., "System and Methods for Fabricating a Component With Laser Array", U.S. Appl. No. 15/433,582, filed Feb. 15, 2017.
Carter, William Thomas, et al., "Additive Manufacturing System and Method of Forming an Object in a Powder Bed", U.S. Appl. No. 15/438,326, filed Feb. 21, 2017.
Graham Michael Evans, et al., "Systems and Methods for Fabricating a Component With at Least One Laser Device", U.S. Appl. No. 15/449,536, filed Mar. 3, 2017.
Harding, Kevin George, et al., "Imaging Systems for Use With Additive Manufacturing Systems and Methods of Imaging a Build Layer", U.S. Appl. No. 62/414,495, filed Oct. 28, 2016.
Ostroverkhov, Victor Petrovich, et al., "Systems and Methods for Additive Manufacturing in-Build Assessment and Correction of Laser Pointing Accuracy", U.S. Appl. No. 62/445,046, filed Jan. 11, 2017.
Harding, Kevin George, et al., "Imaging Devices for Use With Additive Manufacturing Systems and Methods Of Monitoring and Inspecting Additive Manufacturing Components", U.S. Appl. No. 62/445,054, filed Jan. 11, 2017.
Karp, Jason Harris, et al., "Iin-Line Laser Scanner for Controlled Cooling Rates Of Direct Metal Laser Melting", U.S. Appl. No. 615/357386, filed Nov. 21, 2016.
International Search Report and Written Opinion issued in connection with corresponding PCT Application No. PCT/US2018/25169 dated Jul. 9, 2018.

* cited by examiner

SCAN STRATEGIES FOR EFFICIENT UTILIZATION OF LASER ARRAYS IN DIRECT METAL LASER MELTING (DMLM)

BACKGROUND

This disclosure relates generally to additive manufacturing systems, and more particularly, to an additive manufacturing system including scan strategies for efficient utilization of laser rays in a Direct Metal Laser Melting (DMLM) system.

At least some additive manufacturing systems involve the buildup of a powdered material to make a component. This method can produce complex components from powder materials at a reduced cost and with improved manufacturing efficiency. At least some known additive manufacturing systems, such as DMLM systems, fabricate components using one or more laser devices, such as laser arrays, a build platform, a recoater, and a powder material, such as, without limitation, a powdered metal. The laser arrays generate multiple laser beams that melt the powder material on the build platform in and around the area where the laser beams are incident on the powder material, resulting in a melt pool. The build platform is lowered by some amount, for example, 10 to 100 microns and the recoater spreads additional powered build material over the prior layers. The laser arrays are repeatedly swept over the metal powder during the DMLM process in a layer-by-layer manner. During the buildup of the part, each individual laser in the array must be turned ON and OFF selectively as the array is swept back and forth to fuse only the metal powder intended to build the component, leaving behind un-fused powder in areas that do not make up the component. After the process, the un-fused powder is removed to reveal the part.

As the laser array is swept over the component, most lasers are OFF for the majority of the time it takes to build the component. Due to most of the lasers in the array being OFF, this poor utilization of the lasers increases the cost of manufacturing the part. If all lasers were on 100% of the time, a typical component could be built in a minimal amount of time and at less cost.

Accordingly, it is desired to provide a DMLM system that utilizes novel scan strategies for efficient utilization of the operative laser arrays during the buildup of layers during component manufacture.

BRIEF DESCRIPTION

Various embodiments of the disclosure include an additive manufacturing system including scan strategies for efficient utilization of laser rays. In one aspect, an additive manufacturing system configured to manufacture a component is provided, the additive manufacturing system including scan strategies for efficient utilization of one or more laser arrays. The additive manufacturing system includes at least one laser device and a build platform. Each of the at least one laser device including a laser array configured to generate a plurality of individually operable laser beams. The component is disposed on the build platform. The at least one laser device is configured to sweep across the component and the build platform in at least one of a radial direction, a circumferential direction or a modified zig-zag pattern and simultaneously operate the one or more of the plurality of individually operable laser beams corresponding to a pattern of the layer of a build to generate successive layers of a melted powdered material on the component and the build platform corresponding to the pattern of the layer of the build.

In another aspect, an additive manufacturing system configured to manufacture a component is provided. The additive manufacturing system including scan strategies for efficient utilization of one or more laser arrays. The additive manufacturing system includes at least one laser device, a build platform and at least one recoater. Each of the at least one laser device including a laser array configured to generate a plurality of individually operable laser beams. The component is disposed on the build platform. The at least one recoater is configured to coat a powdered build material on the component and the build platform. At least one of the build platform and the at least one laser device is configured to remain stationary. The at least one laser device is configured to sweep across the component and the build platform in at least one of a radial direction, a circumferential direction or a modified zig-zag pattern and simultaneously operate the one or more of the plurality of individually operable laser beams corresponding to a pattern of the layer of a build to generate successive layers of a melted powdered material on the component and the build platform corresponding to the pattern of the layer of the build.

In yet another aspect, a method of manufacturing a component with an additive manufacturing system is provided. The additive manufacturing system including scan strategies for efficient utilization of one or more laser arrays. The additive manufacturing system including a build platform, at least one recoater, and at least one laser device comprising a laser array. The method of manufacturing the component with the additive manufacturing system includes spreading a powdered build material on the build platform and the component with the recoater, generating a plurality of individually operable laser beams with the at least one laser device and generating a layer of a melted powdered build material with the plurality of laser beams. The plurality of individually operable laser beams are directed toward the powdered build material. The at least one laser device is configured to sweep across the component and the build platform in at least one of a radial direction, a circumferential direction or a modified zig-zag pattern and simultaneously operate the one or more of the plurality of individually operable laser beams corresponding to a pattern of the layer of a build to generate successive layers of a melted powdered material on the component and the build platform corresponding to the pattern of the layer of the build.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

In the following specification and the claims, reference will be made to a number of terms, which shall be defined to have the following meanings.

The singular forms "a", "an" and "the" include plural references unless the context clearly dictates otherwise.

"Optional" or "optionally" means that the subsequently described event or circumstance may or may not occur, and the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such a flash memory. Alternatively, a floppy disk, a compact disc-read only memory (CD-ROM), a magneto-optical disk (MOD), and/or a digital versatile disc (DVD) may also be used. In addition, in the embodiments described herein, additional input channels may be, but are not limited to, computer peripherals associated with an operator interface such as a mouse and a keyboard. Alternatively, other computer peripherals may also be used that may include, for example, but not limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media: includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the additive manufacturing systems with novel scan strategies for an increase in laser utilization are disclosed herein. The additive manufacturing system includes a build platform, at least one laser device, a recoater and a platform. Each of the at least one laser devices is configured to include a laser array that generates multiple laser beams directed to a powdered build material on the build platform. During operation, only a portion of the laser arrays are ON at any given time in response to part configuration. The recoater spreads the powdered build material on the build platform. In some embodiments, the build platform rotates relative to the laser array and the recoater between each layer of powdered build material. Disclosed scan strategies for use in the system include novel array scanning strategies, in combination with rotating and non-rotating build plates and/or component being built. Thus, with the use of scan strategies, the laser array utilization can be increased, and the overall cost of part manufacture decreases.

Figure 1:
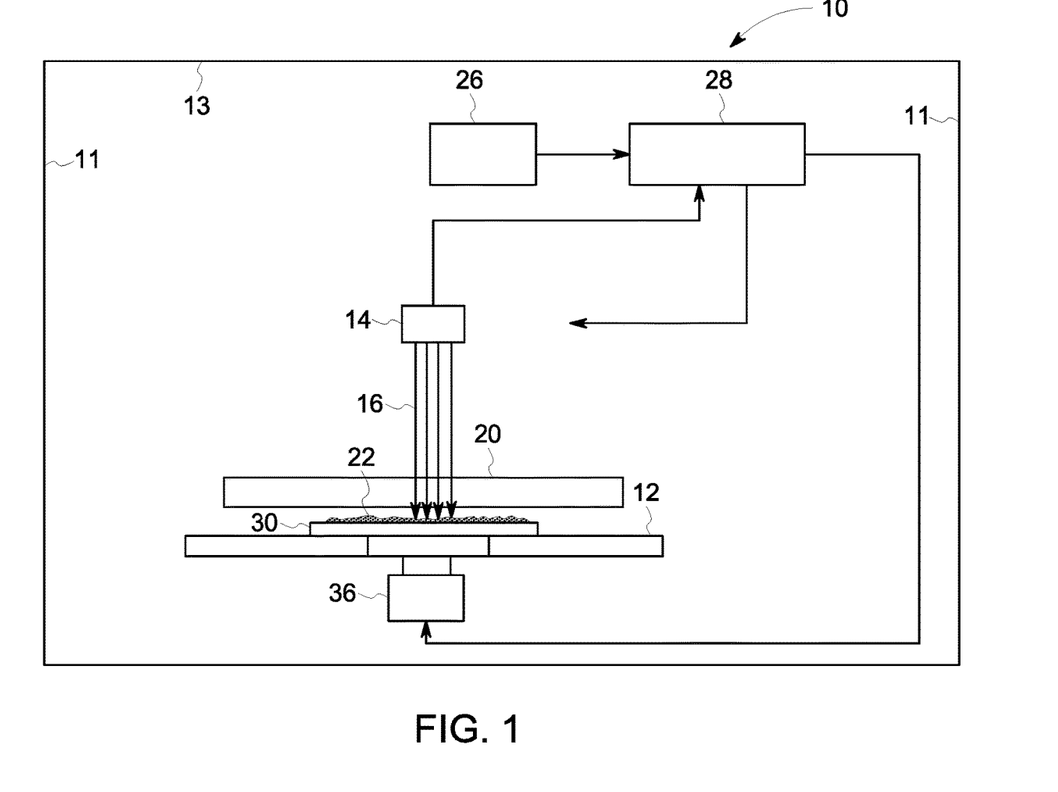
FIG. 1 is a schematic view of an exemplary additive manufacturing system shown in the form of a direct metal laser melting (DMLM) system including a build platform, in accordance with one or more embodiments shown or described herein.

FIG. 1 is a schematic view of an exemplary additive manufacturing system 10 illustrated in the form of a direct metal laser melting (DMLM) system. Although the embodiments herein are described with reference to a DMLM system, this disclosure also applies to other types of additive manufacturing systems, such as selective laser sintering system.

In the exemplary embodiment, the DMLM system 10 includes a build platform 12 and at least one laser device 14, of which only one is illustrated. Each of the at least one laser device 14 including a laser array 15 (FIG. 3), configured to generate a plurality of laser beams 16. In the exemplary embodiment, the build platform 12 has a circular shape. However, the build platform 12 has any shape that enables DMLM system 10 to operate as described herein.

As shown in FIG. 1, the at least one laser device 14 is configured to generate the plurality of laser beams 16 of sufficient energy to at least partially melt a powdered build material 22 on the build platform 12. In the exemplary embodiment, the at least one laser device 14 is comprised of a laser array of ytterbium-based solid state lasers configured to emit a plurality of laser beams having a wavelength of about 1070 nanometers (nm). In other embodiments, the laser device 14 includes any suitable type of lasers that enable the DMLM system 10 to function as described herein, such as carbon dioxide lasers. In an embodiment, the at least one laser device 14 may be optically coupled to one or more optical elements (not shown) that facilitate focusing the plurality of laser beams 16 on the build platform 12. In an embodiment, the optical elements may include a beam collimator, lenses, or any suitable type and arrangement of optical elements that provide for collimated and/or focused laser beams on the build platform 12. In an embodiment, the DMLM system 10 may include one or more scanning devices (not shown) configured to selectively direct the plurality of laser beams 16 across the build platform 12. Additional information on the inclusion of one or more optical elements and/or scanning devices may be found in copending U.S. patent application bearing Ser. No. 15/408, 843, David Charles Bogdan, Jr., et al., "Systems and Methods for Additive Manufacturing Rotating Build Platforms," which is incorporated herein in its entirety.

The exemplary DMLM system 10 also includes a recoater 20 configured to spread the powdered build material 22 across the build platform 12. The DMLM system 10 further includes a computing device 26 and a controller 28 configured to control one or more components of the DMLM system 10, as described in more detail herein. A plurality of walls 11 define an air-locked build chamber 13. In an embodiment, the DMLM system 10 is disposed within the air-locked build chamber 13.

Figure 2:
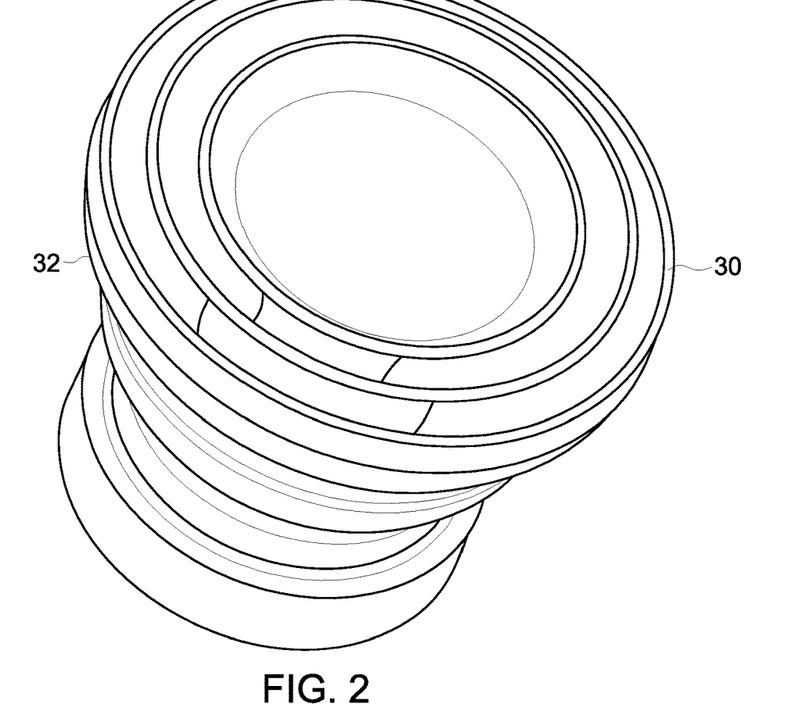
FIG. 2 is a schematic view of an exemplary component manufactured using the additive manufacturing system shown in FIG. 1.

The build platform 12 includes the powdered build material 22 that is melted and re-solidified during the additive manufacturing process to build a solid component 30. An exemplary embodiment of component 30, and more particularly a notional nozzle, is illustrated in FIG. 2. As illustrated, in the exemplary embodiment, the component 30 includes varying geometry, including tapered sidewalls 32. The powdered build material 22 includes materials suitable for forming such components, including, without limitation, gas atomized allows of cobalt, iron, aluminum, titanium, nickel, and combinations thereof. In other embodiments, the powdered build material 22 includes any suitable type of powdered build material. In yet other embodiments, the powdered build material 22 includes any suitable build material that enables the DMLM system 10 to function as described, including, for example and without limitation, ceramic powders, metal-coated ceramic powders, and thermoset or thermoplastic resins.

The computing device 24 includes a computer system that includes at least one processor (not shown in FIG. 1) that executes executable instructions to operate the DMLM system 10. The computing device 24 includes, for example, an electronic computer build file associated with a component, such as the component 30 as best illustrated in FIG. 2.

The build file includes build parameters that are used to control one or more components of the DMLM system 10. The build parameters include, without limitation, a power of laser device 14 and a position and orientation of the laser device 14, as well as one or more scan strategies that enable efficient utilization of the at least one laser device 14, and more particularly the laser array 15 during the build process. In the exemplary embodiment, the computing device 24 and the controller 26 are shown as separate devices. In other embodiments, the computing device 24 and the controller 26 are combined as a single device that operates as both the computing device 24 and the controller 26 as each are described herein.

The computing device 24 may store information associated with a melt pool based on electrical signals, which is used to facilitate controlling and refining a build process for the DMLM system 10 or for a specific component built by the DMLM system 10.

The controller 26 includes any suitable type of controller that enables the DMLM system 10 to function as described herein. In one embodiment, for example, the controller 26 is a computer system that includes at least one processor and at least one memory device that executes executable instructions to control the operation of the DMLM system 10 based at least partially on instructions from human operators. The controller 26 includes, for example, a 3D model of the component 30 to be fabricated by the DMLM system 10. Executable instructions executed by the controller 26 includes controlling the power output of the laser device 14 and controlling a position of the recoater 20.

The controller 26 is configured to control one or more components of the DMLM system 10 based on build parameters associated with a build file stored, for example, within the computing device 24. In the exemplary embodiment, the controller 26 is configured to control the laser device 14 and the recoater 20 based on a build file associated with a component to be fabricated with the DMLM system 10, such as component 30. More specifically, the controller 26 is configured to control the position, movement, and power of the at least one laser device 14 based upon a predetermined path defined by a build file associated with the component 30, t hereby enabling efficient utilization of the at least one laser device 14.

Figure 3:
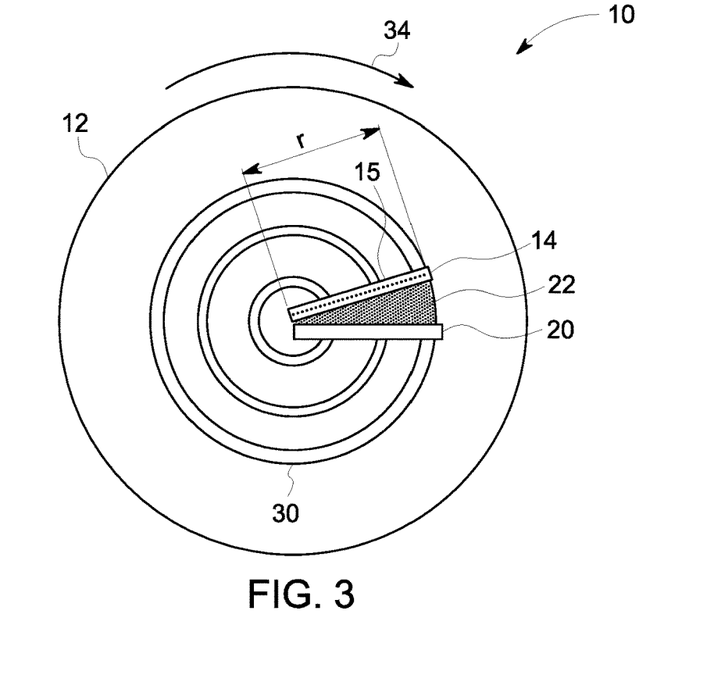
FIG. 3 is a schematic view of another exemplary additive manufacturing system including a novel scan strategy for efficient utilization of laser arrays, in accordance with one or more embodiments shown or described herein.

FIG. 3 is a simplified schematic view the build platform 12 and the recoater 20 of the DMLM system 10 shown in FIG. 1. For illustrative purposes only, the schematic view of FIG. 3 illustrates a single laser device 14, including a laser array 15, configured as a linear laser array spanning a radius "r" of the component 30. In this particular embodiment, the laser device 14, and more particularly the laser array 15, is positioned proximate the recoater 20. During operations, powdered build material 21 is dispensed on the component 30 and the build platform 12. In this particular embodiment, the build platform 12 is configured to rotate relative to the laser array 14 and the recoater 20 between each layer of powdered build material 22, as indicated by arrow 34. The laser device 14 and the recoater 20 remain in stationary positions. While the build platform 12 rotates, the recoater 20 spreads the powdered build material 22 on the component 30 and the build platform 12. In this embodiment, the build platform 22, and thus the component 30, is caused to rotate at a constant rate. The actual cost of the laser device 14 is one-half what a typical laser device spanning the diameter of the component 30 would be. In this particular embodiment, utilization of the laser device 14 is approximately 8% due to required switching of the individual lasers between ON and OFF to build the geometry of the component 30.

Figure 4:
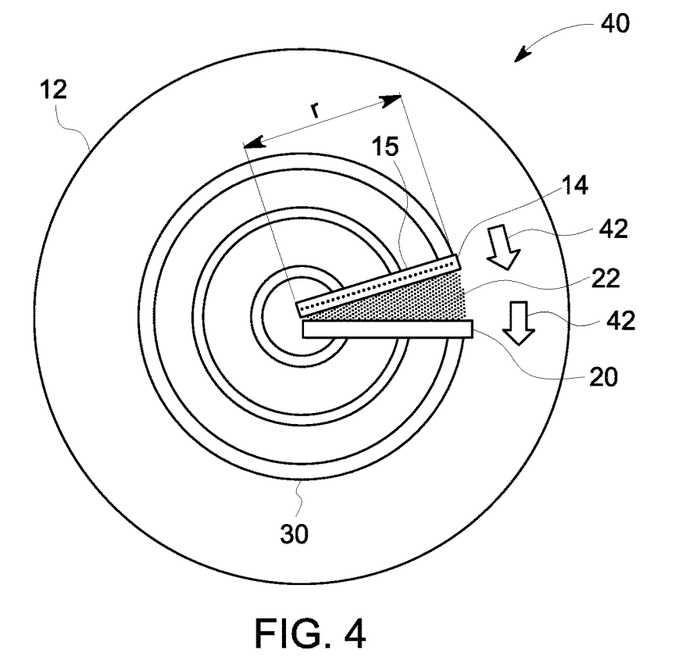
FIG. 4 is a schematic view of another exemplary additive manufacturing system including a novel scan strategy for efficient utilization of laser arrays, in accordance with one or more embodiments shown or described herein.

As previously described, in the embodiment of FIG. 3, the build platform 12 is configured to rotate as indicated by arrow 34. In alternate embodiments, described presently, the build platform 12 is configured to remain stationary as the laser device 14 and the recoater 20 rotate. Such an embodiment is illustrated in FIG. 4, where like numbers represent like elements throughout the embodiments. More particularly, as illustrated in FIG. 4, in another embodiment of a DMLM system, generally referenced 40, the build platform 12 is configured to remain stationary as the laser device 14 and the recoater 20 rotate, as indicated by arrows 42. In this particularly embodiment, the at least one laser device 14 and the recoater are coupled together and rotate while build plate 12 remains stationary.

In another embodiment, the build platform 12, the recoater 20, and the laser device 14 are all configured to rotate. In yet other embodiments, the build platform 12, the recoater 20 and the laser device 14 do not rotate and remain stationary. To provide rotating in the embodiment of FIG. 3, a rotator 36 (shown in FIG. 1) is configured to rotate the build platform 12. The rotator 36 includes any mechanical rotating device that enables the DMLM system 10 to function as described herein. In an embodiment, the build platform 12 rotates between spreading of the layers of powdered build material 22. In an embodiment, the build platform 12 is configured to descend while rotating. In an embodiment, the build platform 12 rotates in a clockwise direction 34, however, the build platform 12 may also rotate in a counter-clockwise direction. In an embodiment, coupling the rotating equipment together reduces the number of rotating pieces and the complexity of the DMLM system 10.

Figure 5:
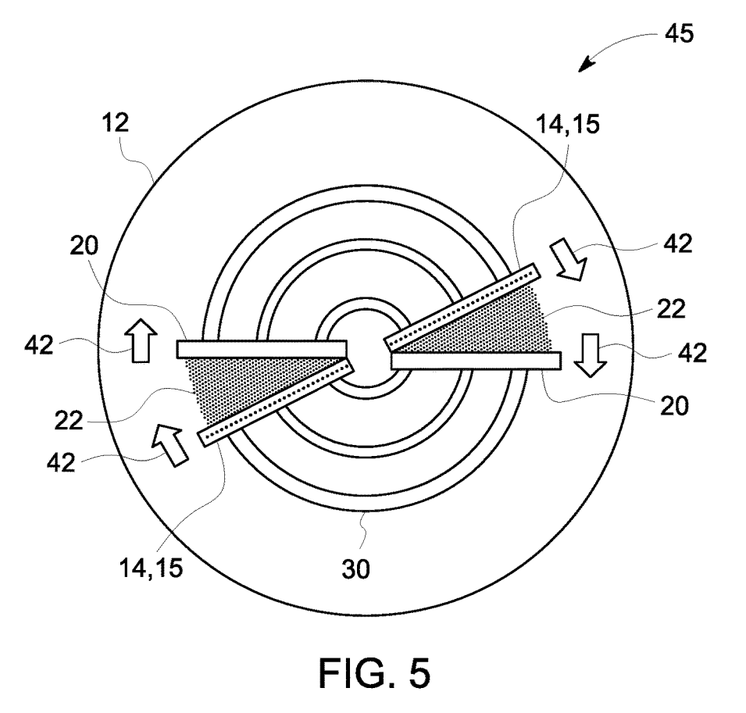
FIG. 5 is a schematic view of another exemplary additive manufacturing system including a novel scan strategy for efficient utilization of laser arrays, in accordance with one or more embodiments shown or described herein.

Referring now to FIG. 5, illustrated is another embodiment of a DMLM system, generally referenced 45. In this particular embodiment, the DMLM system includes two laser devices 14, and more particularly, two laser arrays 14, each configured as a linear laser array spanning a radius "r" of the component 30. In an embodiment, additional laser arrays may be included beyond the two illustrated laser arrays 15. Each of the laser devices 14, and more particularly the laser arrays 15, is positioned proximate a recoater 20 and may be individually controllable. During operations, powdered build material 22 is dispensed on the component 30 and the build platform 12. As illustrated in FIG. 5, the build platform 12 is configured to remain stationary as the laser devices 14 and the recoaters 20 rotate, as indicated by arrows 42. Alternatively, the build platform 12 may rotate while the laser devices 14 and the recoaters 20 remaining stationary, as previously described with respect to FIG. 3. The actual cost of the laser devices 14 is substantially the same as a single laser device spanning the diameter of the component 30 would be. In this particular embodiment, utilization of the laser devices 14 is again approximately 8% due to required switching of the individual lasers between ON and OFF to build the geometry of the component 30.

In the embodiments of FIGS. 3-5, the at least one laser device 14 is configured to sweep across the component 30 and the build platform 12 in a circumferential direction. The at least one laser device 14 is configured to simultaneously operate one or more of the plurality of individually operable laser beams 16 corresponding to a pattern of a layer of the build to generate successive layers of a melted powdered material 22 on the component 30 and the build platform 12 corresponding to the pattern of the layer of the build.

Figure 6:
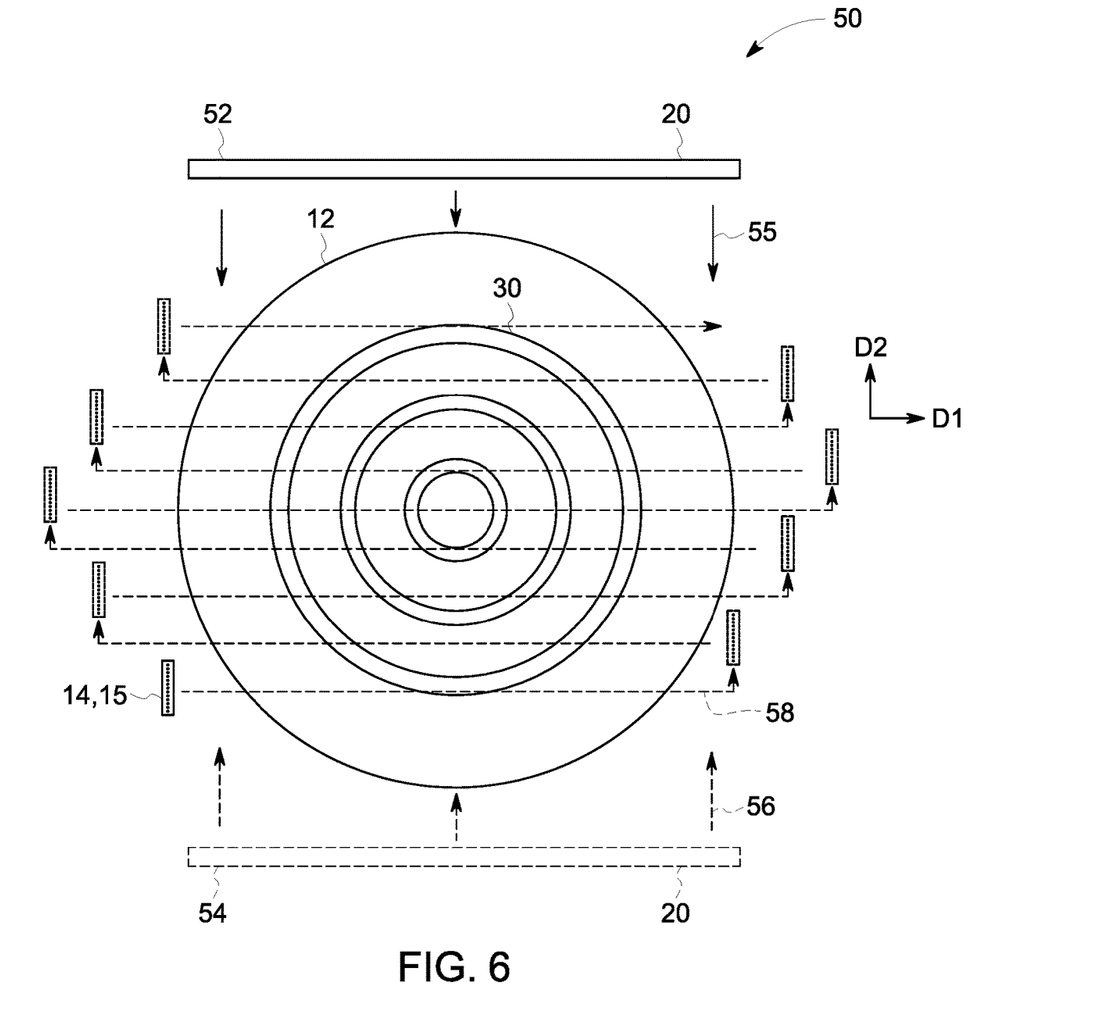
FIG. 6 is a schematic view of another exemplary additive manufacturing system including a novel scan strategy for efficient utilization of laser arrays, in accordance with one or more embodiments shown or described herein.

Referring now to FIG. 6, illustrated is another embodiment of a DMLM system, generally referenced 50. As illustrated, in this particular embodiment, the DMLM system includes a build platform 12, at least one laser device 14, and more particularly, a single laser array 14, configured as a linear laser array and a recoater 20. In an embodiment, additional laser arrays may be included beyond the illustrated laser array 15. FIG. 6 shows the recoater 20 in a first position 52 and a second position 54. During operations, powdered build material 22 is dispensed on the component 30 and the build platform 12. The recoater 20 starts at the first position 52 and moves toward the second position 54 (shown in dotted line) as indicated by arrows 55. While moving from the first position 52 to the second position 44, the recoater 20 spreads the powdered build material 22 on the component 30 and the build platform 12. The recoater 20 moves back to the first position 52 as indicated by the arrows 56. While moving from the second position 54 to the first position 52, the recoater 20 spreads the powdered build material 22 on the component 30 and the build platform 12. In an alternate embodiment, the recoater 20 may be configured similar to the recoater(s) 20 of the previously disclosed embodiments. Similar to the previous embodiments, in the exemplary embodiment of FIG. 6, the build platform 12 has a circular shape. However, the build platform 12 has any shape that enables DMLM system 10 to operate as described herein.

As shown in FIG. 6, the laser device 14 is configured to generate a plurality of laser beams 16 of sufficient energy to at least partially melt the powdered build material 22 of the build platform 12. In this embodiment, the laser device 13 is configured to include a minimum number of laser devices and caused to sweep across the build plate 12 and component 30 in a direction "D1" multiple times per layer as indicated by the dashed line. As the laser device 14 sweeps across the component 30 it is additionally caused to move in a direction "D2". As illustrated, the laser device 14 is thus caused to sweep across the build plate 12 and component 30 in a modified zig-zag pattern, as indicated by dashed line 58. In an exemplary build of the component 30 in FIG. 6, when utilizing a 300-laser array 15, the laser utilization is substantially similar to the embodiment of FIG. 5 at 8% due to required switching of the individual lasers between ON and OFF to build the geometry of the component 30. During the build process, where all lasers in the laser array 15 are OFF for some distance, the array 15 may be accelerated to the next location where power is needed thus increasing laser utilization.

In the embodiments of FIG. 6, the at least one laser device 14 is configured to sweep across the component 30 and the build platform 12 in a modified zig-zag pattern, as indicated by dashed line 58. The at least one laser device 14 is configured to simultaneously operate one or more of the plurality of individually operable laser beams 16 corresponding to a pattern of a layer of the build to generate successive layers of a melted powdered material 22 on the component 30 and the build platform 12 corresponding to the pattern of the layer of the build.

Figure 7:
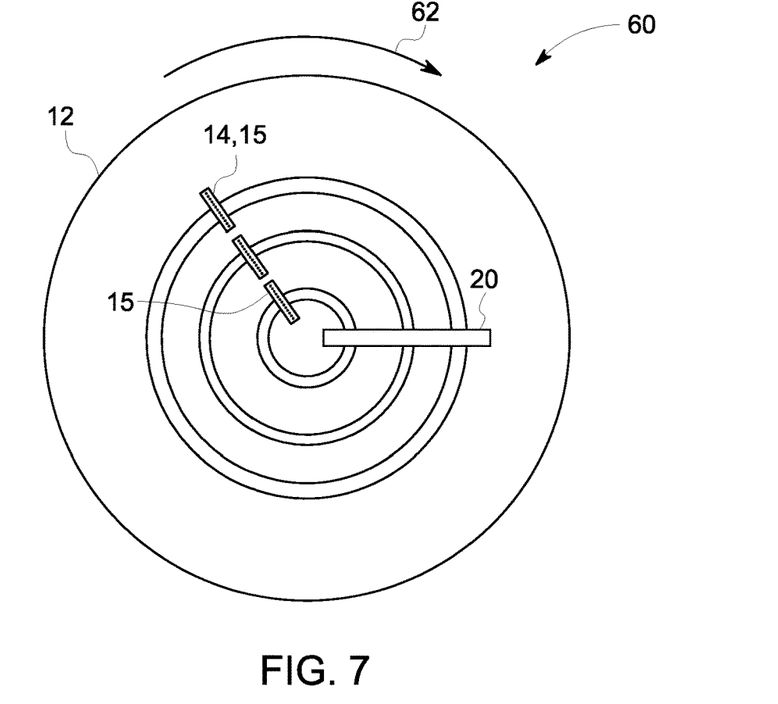
FIG. 7 is a schematic view of another exemplary additive manufacturing system including a novel scan strategy for efficient utilization of laser arrays, in accordance with one or more embodiments shown or described herein.
Figure 8:
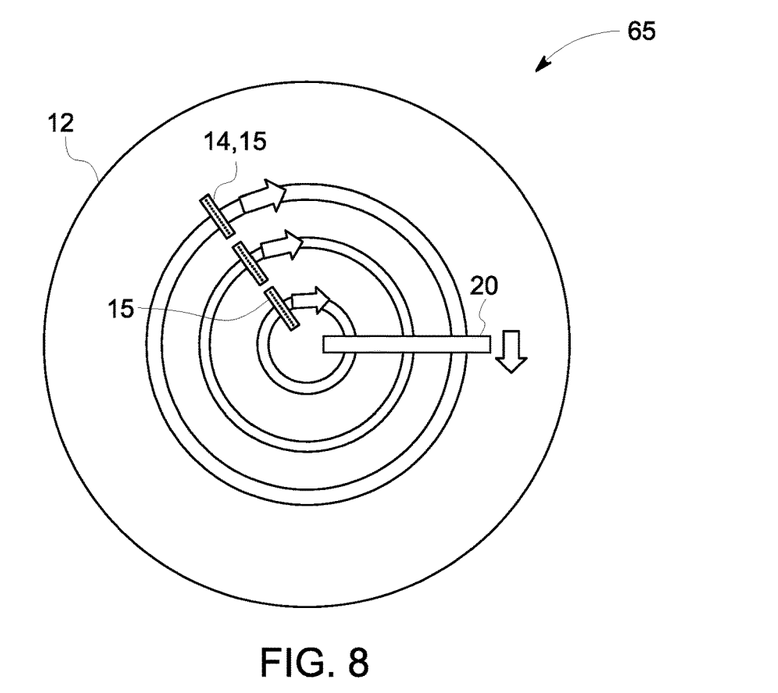
FIG. 8 is a schematic view of another exemplary additive manufacturing system including a novel scan strategy for efficient utilization of laser arrays, in accordance with one or more embodiments shown or described herein.

Referring now to FIGS. 7 and 8, illustrated are additional embodiments of a DMLM system, generally referenced 60 and 65, respectively. In the embodiments of FIGS. 7 and 8, the DMLM system includes multiple laser devices 14, and more particularly, multiple laser arrays 14, each configured as a linear laser array and disposed in a radial arrangement. In an embodiment, additional laser arrays may be included beyond the three illustrated laser arrays 15. Each of the laser devices 14, and more particularly the laser arrays 15, is positioned proximate a recoater 20 and may be individually controllable. In an alternate embodiment, the recoater 20 may be configured similar to the recoater(s) 20 any of the previously disclosed embodiments. During operations, powdered build material 22 is dispensed on the component 30 and the build platform 12. As illustrated in FIG. 7, the build platform 12 is configured to rotate, as indicated by arrows 62, and the laser devices 14 and the recoater 20 remaining stationary. Alternatively, as best illustrated in FIG. 8, the build platform 12 is configured to remain stationary as the laser devices 14 and the recoater 20 rotate, as indicated by arrows 64. As illustrated in FIG. 8, three small laser arrays 15 are each configured to independently move both radially and circumferentially about the component 30. In an exemplary build of the component 30 as illustrated in FIG. 7, utilization of the laser devices 14 is approximately 60% due to required switching of the individual lasers between ON and OFF to build the geometry of the component 30. In an exemplary build of the component 30, as best illustrated in FIG. 8, the laser arrays 15 are caused to rotate and the build plate 12 and component 30 remain stationary. In contrast to the embodiment of FIG. 7, an increased build speed is realized if all arrays 15 move at a maximum rate and each is configured to move radially in response to the contouring of the component walls, to speed the building of the outermost wall 32, of the component 30. In the embodiment of FIG. 8, utilization of the laser devices 14 is approximately 60% due to required switching of the individual lasers between ON and OFF to build the geometry of the component 30. In the embodiments of FIGS. 7 and 8, the actual cost of the laser devices 14 is substantially less than a single laser device spanning the diameter of the component 30, as illustrated in FIGS. 3 and 4.

In the embodiments of FIGS. 7 and 8, the at least one laser device 14 is configured to sweep across the component 30 and the build platform 12 in at least one of a radial or circumferential direction. The at least one laser device 14 is configured to simultaneously operate one or more of the plurality of individually operable laser beams 16 corresponding to a pattern of a layer of the build to generate successive layers of a melted powdered material 22 on the component 30 and the build platform 12 corresponding to the pattern of the layer of the build.

Figure 9:
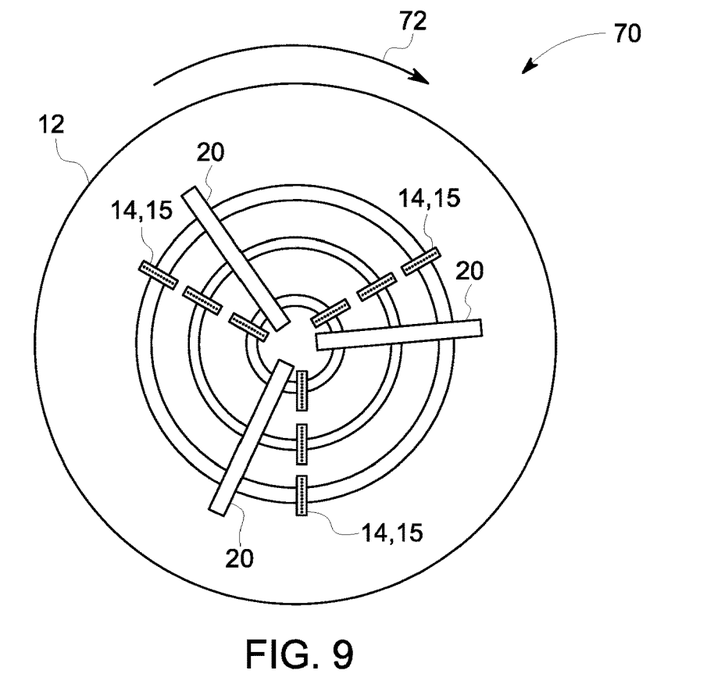
FIG. 9 is a schematic view of another exemplary additive manufacturing system including a novel scan strategy for efficient utilization of laser arrays, in accordance with one or more embodiments shown or described herein.
Figure 10:
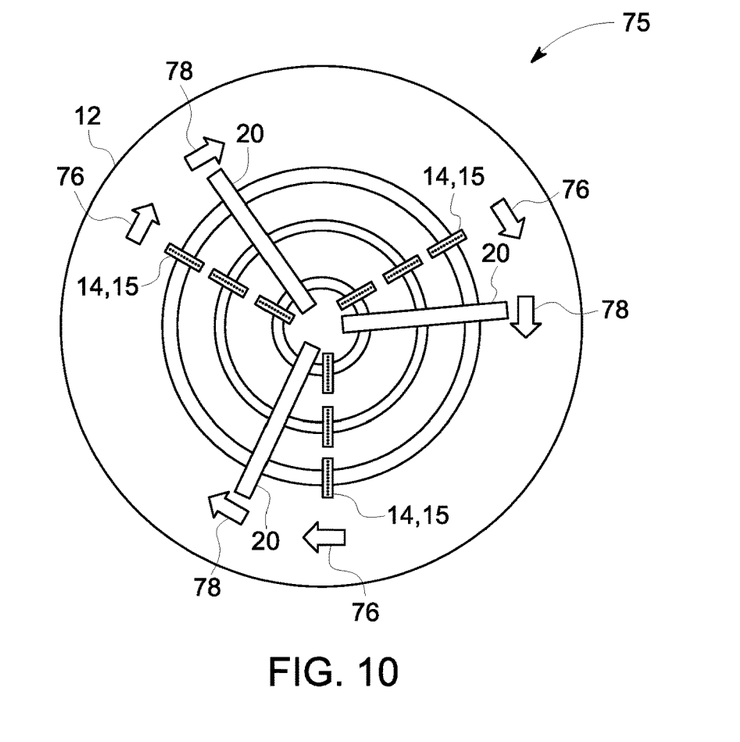
FIG. 10 is a schematic view of another exemplary additive manufacturing system including a novel scan strategy for efficient utilization of laser arrays, in accordance with one or more embodiments shown or described herein.

Referring now to FIGS. 9 and 10, illustrated are additional embodiments of a DMLM system, generally referenced 70 and 75, respectively. The embodiments of FIGS. 9 and 10 build upon the previously described embodiments of FIGS. 7 and 8, with an increase in the number of laser devices 14 used. In the embodiments of FIGS. 9 and 10, the DMLM system includes multiple laser devices 14, and more particularly, multiple laser arrays 15, each configured as a linear laser array and disposed in a radial arrangement. In an embodiment, additional laser arrays may be included beyond the nine illustrated laser arrays 15. Each of the laser devices 14, and more particularly the laser arrays 15, is positioned proximate a recoater 20 and may be individually controllable. In an alternate embodiment, the recoater 20 may be configured similar to the recoater(s) 20 of any the previously disclosed embodiments. During operations, the powdered build material 22 is dispensed on the component 30 and the build platform 12. As illustrated in FIG. 9, the build platform 12 is configured to rotate, as indicated by arrow 72, and the laser devices 14 and the recoater 20 remaining stationary. Alternatively, as best illustrated in FIG. 10, the build platform 12 is configured to remain stationary as the laser devices 14 and the recoater 20 rotate, as indicated by arrows 76 and 78, respectively. As illustrated in FIG. 10, nine small laser arrays 15 are each configured to independently move both radially and circumferentially about the component 30. In the embodiment of FIG. 9, utilization of the laser devices 14 is approximately 60% due to required switching of the individual lasers between ON and OFF to build the geometry of the component 30. In an exemplary build of the component 30, as best illustrated in FIG. 10, the laser arrays 15 are caused to rotate and the build plate 12 and component 30 remain stationary. In contrast to the embodiment of FIG. 9, an increased build speed is realized if all arrays 15 move at a predetermined speed and each is configured to move radially in response to the contouring of the component walls, to speed the building of the outermost wall 32, of the component 30. In the embodiment of FIG. 10, utilization of the laser devices 14 is approximately 60% due to required switching of the individual lasers between ON and OFF to build the geometry of the component 30. In the embodiments of FIGS. 9 and 10, the actual cost of the laser devices 14 is greater than the laser device configuration of FIGS. 7 and 8.

In the embodiments of FIGS. 9 and 10, the at least one laser device 14 is configured to sweep across the component 30 and the build platform 12 in at least one of a radial or circumferential direction. The at least one laser device 14 is configured to simultaneously operate one or more of the plurality of individually operable laser beams 16 corresponding to a pattern of a layer of the build to generate successive layers of a melted powdered material 22 on the component 30 and the build platform 12 corresponding to the pattern of the layer of the build.

Figure 11:
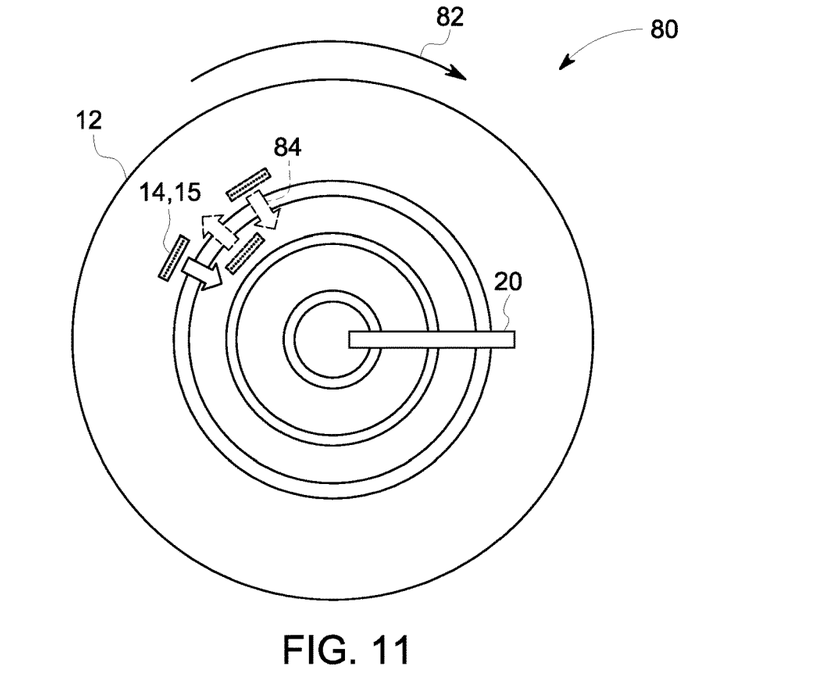
FIG. 11 is a schematic view of another exemplary additive manufacturing system including a novel scan strategy for efficient utilization of laser arrays, in accordance with one or more embodiments shown or described herein.
Figure 12:
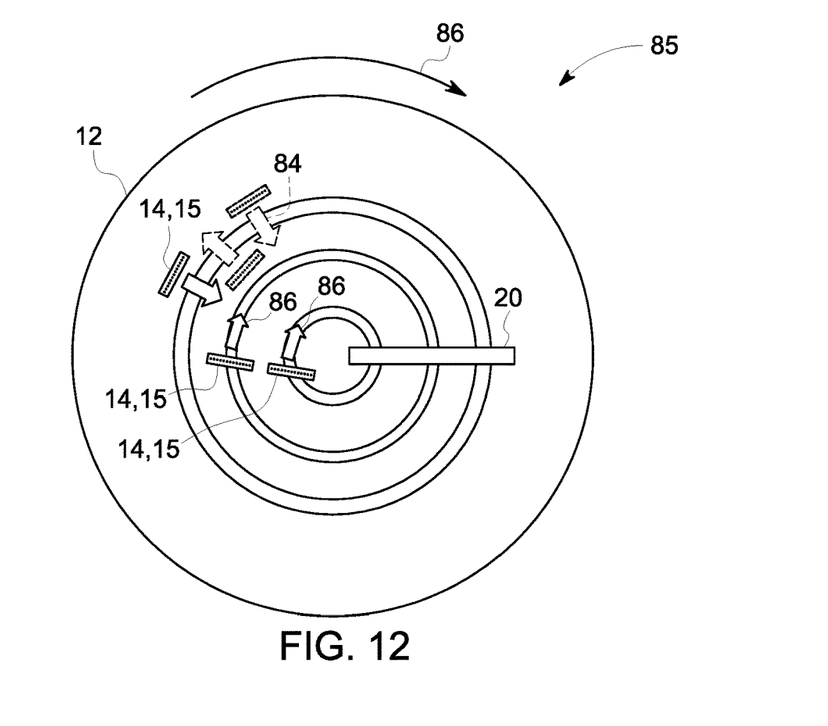
FIG. 12 is a schematic view of another exemplary additive manufacturing system including a novel scan strategy for efficient utilization of laser arrays, in accordance with one or more embodiments shown or described herein.

Referring now to FIGS. 11 and 12, illustrated are additional embodiments of a DMLM system, generally referenced 80 and 85, respectively. The embodiments of FIGS. 11 and 12 build upon the previously described embodiments of FIGS. 7-10, where a plurality of laser devices 14 used. In the embodiments of FIGS. 11 and 12, the DMLM system includes multiple laser devices 14, and more particularly, multiple laser arrays 15, each configured as a linear laser array. In the embodiment of FIG. 11, the multiple laser arrays 14 are disposed in a partial radial arrangement. In an embodiment, additional laser arrays may be included beyond the three illustrated laser arrays 15. Each of the laser devices 14, and more particularly the laser arrays 15, is positioned proximate a recoater 20 and may be individually controllable. In an alternate embodiment, the recoater 20 may be configured similar to any of the recoater(s) 20 of the previously disclosed embodiments. During operations, powdered build material 22 is dispensed on the component 30 and the build platform 12. As illustrated in FIG. 11, the build platform 12 is configured to rotate, as indicated by arrow 82. As the build platform 12 and the component 30 rotate, the laser devices 14 are configured to sweep radially as indicated by arrows 84. In the embodiment of FIG. 12, the build platform 12 is similarly configured to rotate, as indicated by arrow 86 and additional laser devices 14 are included and disposed radially relevant to the outermost laser devices 14. As the build platform 12 and the component 30 rotate, a first portion of the laser devices 14 are configured to sweep radially as indicated by arrows 84, and a second portion of the laser devices 14 are configured to sweep circumferentially as indicated by arrows 86. In an exemplary build of the component 30 as illustrated in FIGS. 11 and 12, the build plate 12 and the component 30 are caused to rotate as the laser devices are caused to translate radially. Utilization of the laser devices 14 is approximately 50% due to required switching of the individual lasers between ON and OFF to build the geometry of the component 30. As previously described, an increased build speed is realized if all arrays 15 move at a maximum rate and the outermost disposed laser devices 14 are configured to move radially in response to the contouring of the component walls, to speed the building of the outermost wall 32, of the component 30.

In the embodiments of FIGS. 11 and 12, the at least one laser device 14, and more particularly at least a portion of the multiple laser devices 14 are configured to sweep across the component 30 and the build platform 12 in both a radial and circumferential direction, while at least another portion of the multiple laser devices 14 are configured to sweep across the component 30 and the build platform 12 in a radial direction. The at least one laser device 14 is configured to simultaneously operate one or more of the plurality of individually operable laser beams 16 corresponding to a pattern of a layer of the build to generate successive layers of a melted powdered material 22 on the component 30 and the build platform 12 corresponding to the pattern of the layer of the build.

Embodiments of the additive manufacturing systems disclosed herein provide improved utilization of the laser devices 14. In an embodiment the build platform 12 and the component 30 are configured to rotate during the build process, while the laser device(s) 14 remain stationary. In an exemplary embodiment, the build platform 12 rotates 30 degrees between spreading of layers of the powdered build material 22. In another embodiment, the build platform 12 rotates between 30 degrees and 180 degrees between spreading of the layers of the powdered build material 22. In yet another embodiment, the build platform 12 rotates between 30 degrees and 60 degrees between spreading of layers of powdered build material 22. In yet another embodiment, the build platform 12 rotates between 90 degrees and 180 degrees between spreading of layers of the powdered build material 22.

In other embodiments, the build platform 12 and component 30 remain stationary, while the laser device(s) 14 rotate during the build process. In an exemplary embodiment, the at least one laser device 14 rotate 30 degrees between spreading of layers of the powdered build material 22. In another embodiment, the at least one laser device 14 rotates between 30 degrees and 180 degrees between spreading of the layers of the powdered build material 22. In yet another embodiment, the at least one laser device 14 rotate between 30 degrees and 60 degrees between spreading of layers of powdered build material 22. In yet another embodiment, at least one laser device 14 rotate between 90 degrees and 180 degrees between spreading of layers of the powdered build material 22. In yet still another embodiment, the build platform 12, the component 30 and the at least one laser device 14 rotate during the build process in a similar manner.

An exemplary technical effect of the methods and systems described herein includes improved strategies for the efficient use of laser arrays, or groups of laser arrays, with the goal of maximizing utilization of lasers or minimizing cost of the lasers. The disclosed DMLM systems can be used to build parts using one or more laser arrays at a low cost by achieving high utilization of the lasers.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems having improved laser utilization are described above in detail. The systems and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system configured to manufacture a component including scan strategies for efficient utilization of one or more laser arrays, the additive manufacturing system comprising:
   at least one laser device, the at least one laser device including a laser array configured to generate a plurality of individually operable laser beams, the at least one laser device sized to melt an area of a powder build material corresponding to a desired pattern of a layer of a build to generate successive layers of a melted powdered material corresponding to the pattern of each layer of the build; and
   a build platform, the component disposed on the build platform,
   wherein each the at least one laser device is configured to sweep across the component and the build platform in at least one of a radial direction or a circumferential direction and simultaneously operate the one or more of the plurality of individually operable laser beams corresponding to the pattern of the layer of the build to generate successive layers of the melted powdered material on the component and the build platform corresponding to the pattern of the layer of the build.

2. The additive manufacturing system in accordance with claim 1, wherein at least one of the build platform or the at least one laser device is configured to rotate relative to the other of the at least one of the build platform or the at least one laser device.

3. The additive manufacturing system in accordance with claim 2, wherein the build platform is configured to rotate the component relative to the at least one laser device between generations of successive layers of the melted powdered material.

4. The additive manufacturing system in accordance with claim 2, wherein the at least one laser device is configured to rotate relative to the component and the build platform between generations of successive layers of the melted powdered material.

5. The additive manufacturing system in accordance with claim 2, wherein the at least one laser device includes a plurality of laser devices, each spanning a portion of a radius of the component.

6. The additive manufacturing system in accordance with claim 2, wherein the at least one laser device is disposed circumferentially about an outermost portion of the build and configured to move in a radial direction, as the build is rotated circumferentially.

7. The additive manufacturing system in accordance with claim 2, wherein the at least one laser device includes a plurality of laser devices, and wherein a first portion of the plurality of laser devices are disposed radially along a portion of a radius of the component and wherein a second portion of the plurality of laser devices is disposed circumferentially about an outermost portion of the build and configured to move in a radial direction, as the build is rotated circumferentially.

8. An additive manufacturing system configured to manufacture a component including scan strategies for efficient utilization of one or more laser arrays, the additive manufacturing system comprising:
   at least one laser device, each of the at least one laser device including a laser array configured to generate a plurality of individually operable laser beams, the at least one laser device sized to melt an area of a powder build material corresponding to a desired pattern of a layer of a build to generate successive layers of a melted powdered material corresponding to the pattern of each layer of the build;
   a build platform, the component disposed on the build platform; and
   at least one recoater configured to coat the powdered build material on the component and the build platform;
   wherein at least one of the build platform and the at least one laser device is configured to remain stationary,
   wherein the at least one laser device is configured to sweep across the component and the build platform in at least one of a radial direction or a circumferential direction and simultaneously operate the one or more of the plurality of individually operable laser beams corresponding to a pattern of the layer of a build to generate successive layers of the melted powdered material on the component and the build platform corresponding to the pattern of the layer of the build.

9. The additive manufacturing system in accordance with claim 8, wherein the at least one laser device is configured to remain stationary and the build platform is configured to rotate the component relative to the at least one laser device between generations of successive layers of the melted powdered material.

10. The additive manufacturing system in accordance with claim 8, wherein the build platform is configured to remain stationary and the at least one laser device is configured to rotate relative to the component and the build platform between generations of successive layers of the melted powdered material.

11. The additive manufacturing system in accordance with claim 10, wherein the recoater is coupled to the laser device, the recoater and the laser device are configured to rotate relative to the build platform.

12. The additive manufacturing system in accordance with claim 8, wherein the at least one laser device includes a plurality of laser devices, each spanning a portion of a radius of the component.

13. The additive manufacturing system in accordance with claim 8, wherein the at least one laser device is disposed circumferentially about an outermost portion of the build and configured to move in a radial direction, as the build is rotated circumferentially.

14. The additive manufacturing system in accordance with claim 8, wherein the at least one laser device includes a plurality of laser devices, and wherein a first portion of the plurality of laser devices are disposed radially along a portion of a radius of the component and wherein a second portion of the plurality of laser devices is disposed circumferentially about an outermost portion of the build and configured to move in a radial direction, as the build is rotated circumferentially.

15. A method of manufacturing a component with an additive manufacturing system including scan strategies for efficient utilization of one or more laser arrays, the additive manufacturing system including a build platform, at least one recoater, and at least one laser device comprising a laser array, the component disposed on the build platform, the method comprising:

spreading a powdered build material on the build platform and the component with the recoater;

generating a plurality of individually operable laser beams with the at least one laser device, the plurality of individually operable laser beams directed toward the powdered build material, the at least one laser device sized to melt an area of a powder build material corresponding to a desired pattern of a layer of a build to generate successive layers of a melted powdered material corresponding to the pattern of each layer of the build, and generating a layer of a melted powdered build material with the plurality of laser beams, wherein the at least one laser device is configured to sweep across the component and the build platform in at least one of a radial direction or a circumferential direction and simultaneously operate the one or more of the plurality of individually operable laser beams corresponding to a pattern of the layer of a build to generate successive layers of the melted powdered material on the component and the build platform corresponding to the pattern of the layer of the build.

16. The method of claim 15, wherein the at least one laser device is configured to remain stationary and the build platform is configured to rotate the component relative to the at least one laser device between generations of successive layers of the melted powdered material.

17. The method of claim 15, wherein the build platform is configured to remain stationary and the at least one laser device is configured to rotate relative to the component and the build platform between generations of successive layers of the melted powdered material.

18. The method of claim 15, wherein the at least one laser device includes a plurality of laser devices, each spanning a portion of a radius of the component.

19. The method of claim 15, wherein the at least one laser device is disposed circumferentially about an outermost portion of the build and configured to move in a radial direction, as the build is rotated circumferentially.

20. The method of claim 15, wherein the at least one laser device includes a plurality of laser devices, and wherein a first portion of the plurality of laser devices are disposed radially along a portion of a radius of the component and wherein a second portion of the plurality of laser devices is disposed circumferentially about an outermost portion of the build and configured to move in a radial direction, as the build is rotated circumferentially.

* * * * *